3,070,497
METHOD OF ALLEVIATING TOPICAL FUNGAL INFECTIONS
Stanley G. Knight, Madison, Wis., assignor to Wisconsin Alumni Research Foundation, Madison, Wis., a corporation of Wisconsin
No Drawing. Filed Oct. 15, 1959, Ser. No. 846,544
4 Claims. (Cl. 167—58)

The present invention relates to the pharmaceutical field and more specifically to the method of alleviating topical fungal infections and provides means, in the presence of esterase or like fat splitting enzyme, (a) for inhibiting fungal growth and (b) for maintaining a pH of about 4-5, at the site of the infection. The latter, i.e. maintaining the specified acidic pH, as well as the former, i.e. stopping the fungal growth, are both highly desired in the clinical field as pointed out in detail below.

In the initial investigations leading to the present invention it was first noted in invitro tests that triacetin and other glycerides of certain fatty acids possessed some fungistatic activity as well as some bacteriostatic activity. As the glycerides were known to be substantially non-toxic it was hoped that they could be used in the food field, e.g. in food or food wrappers, to control mold growth. Extensive investigations, however, demonstrated the glycerides to be relatively low in activity in this environment and to be of no practical use in the food field.

In continued in vitro studies it was further noted that the glycerides in which fungistatic activity could be demonstrated exhibited antifungal activity with certain types of fungi but not with other fungi. This finding focused interest on the modus operandi and posed the following questions: (1) Why do glycerides which are considered inert have any fungistatic activity at all, and (2) Why do glycerides which exhibit fungistatic activity have this activity with some fungi and not with other fungi. As certain free fatty acids were known to be fungistatic in character, it appeared that the activity of the glyceride might possibly be traced to the splitting or hydrolysis of the glyceride and the liberation of free fungistatic acid. This possibility did not provide a full or satisfactory explanation of the mechanism involved, however, as it was known that the glycerides are substantially neutral, relatively stable materials which do not undergo hydrolysis in inert media at room temperature. Also, this approach failed completely to explain why the active glycerides exhibited antifungal properties with certain fungi and not with other fungi. With continued investigation it was then discovered that when the glyceride exhibited fungistatic activity esterase activity could always be demonstrated and when the glyceride exhibited no fungistatic activity no esterase activity could be demonstrated. From this it was deduced that the presence of esterase or like fat splitting enzyme was necessary for fungistatic activity and that the esterase supplied by the types of fungi susceptible to the glycerides apparently enzymatically hydrolyzed the glyceride liberating the active fungistatic acid in situ at the site of the mold growth.

Up to this time the investigations had been limited to in vitro tests and the low activities found were such that the use of the glycerides in the clinical field, like the food and food wrapper fields, appeared of no importance. However, in view of the apparent finding of the critical part played by esterase, in vitro tests were continued with added blood serum containing natural serum lipase or esterase. These tests demonstrated that the serum enhanced and in many instances greatly potentiated the fungistatic action of the glyceride. This is illustrated by Knight, S. G., Antibiotics & Chemotherapy, VII, 172–174 (April 1957). As shown here, 0.1% triacetin failed to inhibit the growth of *Candida albicans* on Sabouraud's dextrose agar while 0.1% triacetin in combination with 10% serum inhibited growth and reduced the diameter of the *C. albicans* colony from 20 to 14 mm. Also, as shown here, 0.1% triacetin reduced the diameter of a colony of *Epidermophyton floccosum* from 57 to 19 mm. while 0.1% triacetin in combination with 5% serum gave complete inhibition, i.e. reduced the diameter of the *E. floccosum* colony to zero (0). See also Knight, S. G., J. Investigative Dermatology 28, 363–366, (1957).

With the discovery that blood serum potentiated the fungistatic action of the glycerides coupled with the knowledge that blood serum exhudates are normally present in fungi infections, it was decided that the glycerides warranted at least limited in vivo studies in the clinic for "athlete's foot" or like type infections caused by superficial dermatophytes. These studies indicated triacetin (glyceryl triacetate) to be the glyceride of choice and illustrative results of the early clinical investigation have been reported by Johnson, Sture A. and Turra, James L. in A.M.A. Archives of Dermatology 74, 73–75 (1956). As shown here infections due to *T. mentagrophytes, M. lanosum, E. floccosum, M. furfur* and *Nocardia tenuis* responded well to treatment with triacetin. Also as shown here, cures were obtained with infections caused by *T. purpureum* and *M. audouini*, although the overall response to triacetin was not as good with these two organisms as with the other pathogenic organisms.

The modus operandi based on evidence accumulated with continued investigations can be explained by the fact that while triacetin per se is inactive in the absence of esterase or like fat splitting enzyme, it acts as a reservoir for the fungistatic active acetic acid which is released in situ at the site of the infection in the presence of the fat splitting enzyme, supplied, for example, by the fungi itself or by the serum exhudates. Investigations also show that the pH at the site of the infection is abnormally alkaline (e.g. in the absence of triacetin runs about pH 7 or above), and that it is maintained at about pH 4 to 5 in the presence of triacetin and esterase. This can be explained by the fact that the esterase becomes very active and liberates acetic acid rapidly at pH's above pH 5 as well as when the pH approaches and starts to go above pH 5 and by the fact that the esterase becomes inactive and stops liberating acetic acid as the pH approaches and starts to go below pH 4. See the above Knight publications, supra. As a result the pH is automatically maintained at about pH 4 to 5. This is highly desirable clinically as the pH of healthy skin is about 4–5, and the maintaining of the pH within this narrow range conditions the skin to fight the infection and aids materially in the healing of the skin and the returning of the skin to its normal healthy condition. See in this connection, Burack and Knight, Jl. Investigative Dermatology 30, 197–199 (1958), with its reference to the abnormal alkalinity produced in the infectuous process and the probable role played by acetic acid on this as well as directly on the dermatophyte.

The triacetin compositions employed in the present invention are preferably made up of triacetin dispersed or dissolved in inert (non-toxic and non-irritating) pharmaceutical diluents or carriers. The diluents or carriers should be free from buffering materials as well as acidic and alkaline materials which interfere with maintaining the pH at the site of the fungi infection within the above noted range of pH 4–5. Non-aqueous, neutral diluents or carriers such as the polyethylene glycol ointment base described below in Example I and the calcium silicate-talc powder base described below in Example V, are illustrative of preferred types of diluents or carriers. With non-volatile diluents or carriers of this type, the amount of triacetin can vary from about 5% to 50% or more by weight with about 25% being preferred. Compositions containing 25% triacetin, for example, were found more effective than compositions containing 5% and about as effective as compositions containing 50%. With volatile diluents or carriers, less than 5% triacetin can be employed (see Example VI below) as long as the residue remaining at the site of the infection, after evaporation of the volatile diluent or carrier, contains at least 5% of triacetin.

The following are illustrative examples of triacetin compositions adaptable for use in the present invention.

*Example I*

About 75 grams of an inert polyethylene glycol ointment base made up of about equal parts of Carbowax 4000 and polyethylene glycol 400 (see McClelland et al., Chem. Eng. News 23, No. 3, page 247, 1945) was thoroughly mixed with 25 grams of triacetin. This composition is stable on storage and is an effective antifungal agent. It is not odorous and is easily applied to skin and like areas infected with fungus.

*Example II*

About 75 cc. of a 50–50 isopropanol-water mixture is mixed with 25 cc. of triacetin. This composition like the composition of Example I is an effective antifungal agent. See Johnson and Turra, A.M.A. publication, supra.

*Example III*

30 grams of polyethylene glycol 400 and 34 grams of polyethylene glycol 4000 were placed in a beaker in a water bath and heated with stirring until the mixture melted and was at a temperature of about 70° C. In a separate vessel, 1 gram of titanium dioxide was triturated with 10 grams of polyethylene glycol 400 and this mixture was transferred to the heated mixture or melt. Next, 25 grams of triacetin were added and the beaker contents were cooled to below 38° C. with continuous stirring. This composition contained about 25% by weight of triacetin.

*Example IV*

13.5 grams of triacetin previously chilled in a Dry Ice-acetone bath were placed in an aerosol container of 3 ounce capacity and then 76.5 grams of a similarly chilled solution consisting of 60% Freon 11 ($CCl_3F$) and 40% Freon 12 ($CCl_2F_2$) were added. The valve and seal were then immediately inserted in accordance with standard practices in the aerosol bomb art. This composition contained 85% by weight of propellant and 15% by weight of triacetin which remains as an oily residue after evaporation of the propellant. In a similar manner compositions containing about 5 up to 25% or more by weight of triacetin were prepared with aerosol propellants of the fluorochloro-methane and ethane or like type. Small amounts (e.g. 1–5%) of polyvinylpyrrolidone (PVP) were included in certain of these compositions.

*Example V*

26.6 grams of calcium silicate (Microcel) were placed in a vessel equipped with a stirrer and 33.4 grams of triacetin were added slowly with mixing; the mixing was continued until an even blend was obtained. To this mixture were added 40 grams of talc; the mixture was blended thoroughly and the powder was passed through a No. 40 mesh screen and reblended. This composition contained about 33% by weight of triacetin and about 67% by weight of inert carrier. In a similar manner compositions containing 10–50% or more by weight of triacetin were prepared with inert inorganic powdered diluents or carriers.

*Example VI*

The powders prepared as above in Example V can be used as dusting powders or can also be used in aerosol form. An illustrative aerosol composition was prepared as in Example IV above consisting of 15 parts by weight of powder (comprising 25% triacetin, 7.5% calcium silicate and 67.5% of talc), and 85 parts by weight of a propellant mixture comprising 75% Freon 11 ($CCl_3F$) and 25% Freon 12 ($CCl_2F_2$). This composition contained about 3.75% triacetin but upon evaporation of the propellant leaves a residue containing 25% triacetin.

The compositions of Examples I and III–VI are non-aqueous, i.e. substantially water-free and were proven to be exceptionally stable and are preferred. The aqueous composition of Example II was found on long standing, particularly at warm temperatures, to undergo some decomposition with the liberation of excessive amounts of free acetic acid. In the aerosol compositions the use of a propellant consisting of a mixture of Freon 11 and Freon 12 and containing at least 50 parts by weight of Freon 11 was found to be preferred. The propellants along with the other carriers should be of the type which are non-irritating and which do not interfere with maintaining the prescribed pH limits.

With reference to Example IV, it has also been found highly desirable to include a small amount, e.g. 1–5% by weight, of liquid polyethylene glycol or the like with the triacetin to prevent skin drying when the aerosol mixture is applied to the skin. Any liquid polyethylene glycol, e.g. polyethylene glycol 200–400, can be employed, but in all cases should be employed only in the amounts which are completely miscible with the triacetin. Example VII illustrates a preferred composition.

*Example VII*

The composition was prepared using the general procedure of Example IV except that the polyethylene glycol is dissolved in the triacetin and the cooled mixture (−20° C.) then added to the container followed by the Freons. The composition in the aerosol container comprised 15% by weight of triacetin; 1.67% by weight polyethylene glycol 400; and about 83.33% by weight of the propellant, i.e. the $CCl_3F$. AND $CCl_2F_2$ (Freon 11 and Freon 12) mixture employed in Example IV. Upon evaporation of the propellant the residue contains a little over 98% triacetin.

The triacetin compositions of the type illustrated above for use in the present invention are for topical application as distinguished from internal use. They can be applied topically in ointment, powder, lotion, solution or like forms, as such, or in aerosol form, to the side of the fungus infection on the skin, including the feet for athlete's foot (tinea pedis), the scalp for ringworm (tinea capitis), etc. They can also be topically applied to the surfaces of body orifices such as the ear and nose as well as the surfaces of the vagina for the treatment of vaginitis where the maintaining of an acidic pH of about 4–5, as provided for by the triacetin, is clinically indicated. See Rakoff et al., Am. Jl. Obstetrics and Gynecology 47, 467 (1944). In all cases the infected area should be coated or covered with triacetin per se or triacetin dispersed in an inert carrier containing at least 5% and preferably about 25% triacetin, and the coating at the site of the infection maintained until the infection clears and tests for the infecting organism are negative.

The triacetin employed in the present invention on the one hand is non-toxic and non-irritating and on the other hand has proven to be a potent clinical antifungal agent in the presence of esterase or like fat splitting enzyme which is potentiated by blood serum. The finding of these unique properties in an agent for use in this field is truly remarkable as most chemical antifungal agents are relatively toxic and tend to be irritating in character.

The present application is a continuation-in-part of my copending application Serial No. 746,618, filed July 7, 1958, now abandoned, which in turn is a continuation-in-part of my prior application Serial No. 596,821, filed on July 10, 1956, now abandoned, which in turn is a continuation-in-part of my prior application Serial No. 424,768, filed April 21, 1954, now abandoned, which in turn is a continuation-in-part of my prior application Serial No. 322,799, filed November 26, 1952, now abandoned.

Others may practice the invention in various ways suggested to one skilled in the art upon reading the specification. Additional medicaments, for example, which do not interfere with the anti-fungal activity of the triacetin can be included in the compositions of the type described above and it is intended that all such practice of the invention be included hereunder falling within the scope of the appended claims.

It is claimed:

1. The method of alleviating topical fungal infections characterized by the presence of the fat splitting enzyme esterase, which comprises applying triacetin in an inert pharmaceutical carrier to the infected area in an amount sufficient to inhibit fungal growth and provide a pH of about 4–5.

2. The method of alleviating topical fungal infections characterized by the presence of esterase and which method includes means for maintaining a pH of about 4–5 as well as inhibiting fungal growth, which comprises covering the site of the infection with a coating containing at least about 5% by weight of triacetin, by applying a composition made up of triacetin dispersed in an inert pharmaceutical carried to the area infected by the fungal growth.

3. The method of claim 2 where the carrier is an ointment base containing about 25% by weight of triacetin.

4. The method of claim 2 where the carrier is a powder base containing about 25% by weight of triacetin.

References Cited in the file of this patent

UNITED STATES PATENTS

| | | |
|---|---|---|
| 1,627,963 | Fuller | May 10, 1927 |
| 2,173,124 | Meyer et al. | Sept. 19, 1939 |

OTHER REFERENCES

Tanissa: Biological Abstracts, vol. 24, August 1950, pages 2292–3.

Smith et al.: Zinsser's Textbook of Bacteriology, 9th edition, Appleton-Century-Crafts, Inc., N.Y. (1948), page 83.

Karrer: Organic Chemistry, 2nd edition, Elsevier Publ. Co., N.Y. (1946), page 199.

Wyss et al.: Arch. of Biochemistry, vol. 7, July–September 1945, pages 415–425.

Grunberg: Yale J. of Biology and Medicine, 19: 5, May, 1947, pages 855–876.

Hackh: Chem. Dictionary, 3rd ed., McGraw-Hill Book Co., Inc., N.Y. (1944), pages 315, 756.

U.S. Dispensatory, 24th ed., J. B. Lippincott Co., Philadelphia, Pa. (1947), page 512.